May 28, 1968  G. MESSEN-JASCHIN  3,385,196
INSTALLATION FOR PURIFYING AIR ADJACENT
TO STREET STRUCTURES
Filed April 29, 1966

INVENTOR.
Gregori Messen-Jaschin
BY
Baldwin & Wight
attorneys

United States Patent Office 3,385,196
Patented May 28, 1968

3,385,196
INSTALLATION FOR PURIFYING AIR ADJACENT TO STREET STRUCTURES
Gregori Messen-Jaschin, Sarnen, Switzerland, assignor to G. A. Messen-Jaschin, Sarnen, Switzerland, a corporation of Switzerland
Filed Apr. 29, 1966, Ser. No. 546,249
Claims priority, application Switzerland, Apr. 29, 1965, 6,083/65
6 Claims. (Cl. 98—49)

ABSTRACT OF THE DISCLOSURE

An installation for purifying air adjacent e.g. a street structure having an underground canal for draining water includes a water trap having a sump in the bottom of the canal and a partition extending from the upper part of the canal into the sump, the installation enabling flow in the canal from the upstream side to the downstream side of the installation, but preventing flow of air in the canal from the downstream side of the installation to the upstream side thereof when there is water in the canal. An air flow ventilator in the upper part of the canal on the upstream side of the partition enables sucking air from the canal on the upstream side of the partition. Unpure air introduced into the canal at the upstream side of the installation is cooled by water in the canal and the condensible gases in the unpure air are thereby condensed so that the exhausted air has been substantially purified.

---

Figure 1:
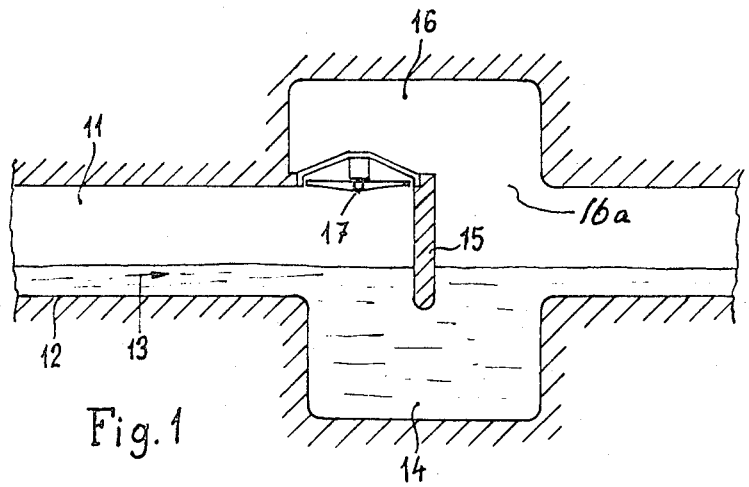

This invention relates to installations for purifying air adjacent to street structures, and more particularly to installations of the kind for use in large cities and other areas where there is heavy traffic of vehicles driven by internal combustion engines.

It is well known that internal combustion engines, e.g. automotive engines, discharge exhaust gases containing components which have a toxic effect upon humans. The vast increase in internal combustion engine powered road vehicles has already led to severe air pollution problems, particularly in large cities, and this is increasing. Exhaust gases are discharged by the exhaust pipes of automobile engines at levels relatively near the ground surface, and since these exhaust gases in general are heavier than air they are inclined to remain close to the ground. They may be caused to swirl upwardly somewhat by passing traffic, but this only aggravates the problem since the rise due to traffic induced swirling is just about enough to bring the gases to a level of breathing by pedestrians and motorists in other automobiles. Since the gases usually do not rise to heights much higher than the heights of the vehicles themselves, the toxic gases remain as a dangerous element. While such toxic gases sometimes and in some localities can be dispersed somewhat by natural wind, the wind dispersing effect frequently is of little or no consequence, particularly in areas having rows of high buildings adjacent the streets. In addition, hot sunshine, which prevents or minimizes any flow of air in low lying streets, may develop a dangerous thermal condition.

The pollution of the air with toxic gases constitutes only a part of the degradation of the air for breathing by humans. Additionally, the constant withdrawing of oxygen from the air and consumption of the oxygen by the vehicle engines so reduces the oxygen content as to result in what is termed "smog" in some localities.

An object of the present invention is to provide an installation for minimizing the degradation of air in traffic areas, both from the standpoint of reducing pollution by toxic components and by inhibiting the production of smog.

Installations in accordance with the invention are particularly useful in areas having street structures with underground canals for draining off waste water. In accordance with the invention, a ventilator is arranged in the upper portion of a canal element and in advance of, that is on the upstream side of, a water trap. The water trap enables flow of water and air in the canal from the upstream side of the water trap to the downstream side thereof, but prevents flow of air in the canal from the downstream side of the water trap to the upstream side thereof when there is water in the canal. Air is sucked from the above-the-street area into the canal and flows downstream therein over the water being drained, and is then diverted at the water trap and is forced to the downstream side of the water trap or, in a modified construction, is discharged through an air purifying filter to the atmosphere above the street surface. In many cases, it is sufficient to locate such water traps and ventilators in main channels of the underground canal system, the air being drawn through laterals or branches into the main channels.

Figure 2:
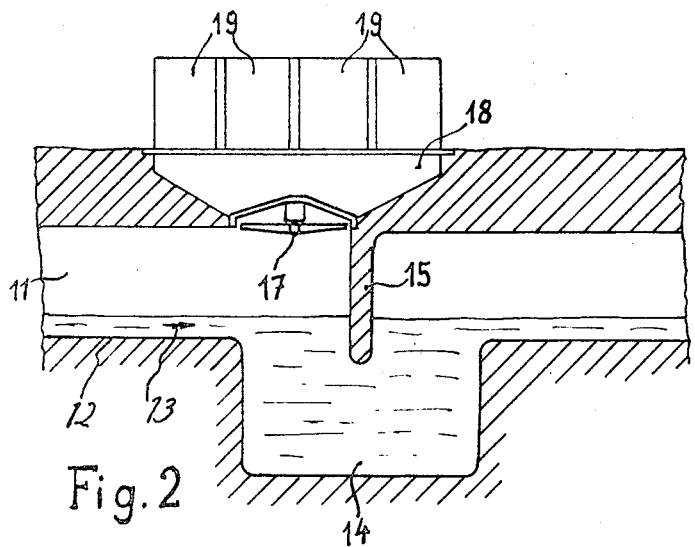

Representative embodiments of the invention are illustrated in the accompanying drawings, in which:

FIGURE 1 is a somewhat schematic representation, in vertical section, of an installation according to the invention in which air is drawn from the canal on the upstream side of a water trap and is forced through a ventilator to the canal on the downstream side of the water trap; and FIGURE 2 is a somewhat schematic view in vertical section of an installation according to the invention in which air removed from the canal on the upstream side of the water trap is discharged through filtering equipment into the atmosphere above the street level.

In the installation shown in FIGURE 1, a main underground canal channel 11 conducts waste water flowing in from the street surface through sewer openings along the bottom 12 of the canal to the right in the direction of the arrow 13 for discharge at any convenient point. The level of the water in the canal is relatively low in dry weather and is relatively high in rainy weather. The cross section of the canal chanel 11 is such that the maximum anticipated quantity of waste water can be carried off even under exceptional conditions caused, for example, by thunderstorms. In dry weather, the canal may serve mainly as an air channel system permitting air to be sucked away from the area just above the street surface so that an artificial circulation of air can be produced.

For ensuring that the air sucked down from the street will flow through the channel 11 in the direction of the arrow 13, that is in the direction of flow of the waste water for delivery to the channel discharge point, a water trap 14 is provided in the bottom of the channel. The water trap comprises a chamber or sump which extends downwardly from the bottom of the channel 11 and communciates with the canal. A partition wall 15 extends from the level of the top of the canal downwardly through the canal and into the sump to a level below the bottom of the canal and above the bottom of the sump. Even in dry weather when there is little or no flow of water through the canal, the lower edge of the partition 15 will extend into residual water remaining in the sump, and the water trap structure will, therefore, prevent flow of air in the canal from the downstream side of the partition to the upstream side thereof.

For enabling air to flow from the upstream side of the water trap to the downstream side thereof in the canal, an air flow ventilator is provided in the upper part of the canal structure. As shown in FIGURE 1, the ventilator comprises a chamber 16 located above the partition wall 15 and a forced air ventilator fan or the like means on the upstream side of the partition between the top of the canal and the chamber 16. In operation, the ventilator element 17 sucks air from the canal on the upstream side of the water trap partition wall 15 and forces the air through the chamber 16 and an outlet opening 16a therein into the canal on the downstream side of the water trap. In this way, it is ensured that degraded air will be drawn from just above the street level through sewer openings (not shown) into the canal 11 and downstream past the water trap and through the canal to the point of discharge, which, of course, should be remote from areas frequented by humans.

In the construction shown in FIGURE 2, the canal and siphon are the same as in FIGURE 1, and the corresponding parts thereof are therefore identified by the same reference numerals as in FIGURE 1. However, in the construction shown in FIGURE 2, the ventilator chamber 18 is open at its bottom to the canal only on the upstream side of the partition 15. Surmounting the ventilator chamber 18 are electro-filtering devices 19 through which air delivered by the fan or blower 17 is passed for being purified before being discharged to the atmosphere above the street level.

Generally considered, in operation of an installation according to the invention, toxic traffic exhaust gases are drawn from just above the street surface and are passed through the canal system. Hydrocarbon gases will condense due to the cool temperature prevailing in the canal system. Nitrous gases which are soluble in water will easily become dissolved in their long travel over the water in the canal system, the saturation of the air or gas with water vapor above the level of the water in the canal system promoting this dissolving. The air flow and the water flow in the same direction in the canal components mutually support each other.

An ancillary but nevertheless important advantage of installations according to this invention is that the passing of polluted air with a high content of poisonous gases from the street through the canal system contributes to the reduction of rat life in the canal system.

The installations shown by way of example embody the invention in preferred forms, but it is intended that the disclosure be illustrative rather than definitive, the invention being defined in the claims.

I claim:

1. In an installation for purifying air adjacent a street structure having an underground canal for draining off waste water and in which canal waste water flows in a stream from upstream of said installation in a downstream direction past said installation to the downstream side thereof, the combination with said canal of a water trap comprising a sump in the bottom of said canal and a partition extending from the upper part of said canal into said sump to a level below the bottom of the canal, said installation enabling flow of water in said canal from the upstream side of said installation to the downstream side thereof but preventing flow of air in said canal from the downstream side of said partition to the upstream side thereof when there is water in said canal; and means including an air flow ventilator in the upper part of said canal at the upstream side of said partition for sucking air from said canal at the upstream side of said partition, the unpure air being introduced into said canal at the upstream side of said installation, being cooled by water in said canal and the condensible gases in the unpure air being thereby condensed, and the air being exhausted substantially purified.

2. Installation according to claim 1 in which said ventilator has a discharge opening communicating with said canal on the downstream side of said water trap.

3. Installation according to claim 2 in which said ventilator includes a chamber positioned above said water trap and extending upwardly from the top of said canal.

4. Installation according to claim 3 including means for forcing air to flow through said ventilator chamber in the downstream direction.

5. Installation according to claim 1 including a filtering device positioned to receive air discharged by said ventilator and to deliver filtered air outside said canal.

6. Installation according to claim 5 in which said filtering device is an electro-filtering device which discharges filtered air to the atmosphere.

References Cited

UNITED STATES PATENTS

| | | | |
|---|---|---|---|
| 261,081 | 7/1882 | Comstock et al. | 110—145 X |
| 1,090,071 | 3/1914 | Kellems | 98—1 X |
| 1,090,072 | 3/1914 | Kidd | 98—1 X |
| 1,392,870 | 10/1921 | Fessler | 98—1 |
| 1,637,873 | 8/1927 | Nosan | 98—1 X |
| 3,035,507 | 5/1962 | Gresham | 98—115 |

FOREIGN PATENTS 473,854  10/1937  Great Britain.

ROBERT A. O'LEARY, *Primary Examiner.*

M. A. ANTONAKAS, *Assistant Examiner.*